US012782777B2

(12) United States Patent
Nagano et al.

(10) Patent No.: US 12,782,777 B2
(45) Date of Patent: Nov. 3, 2026

(54) SHEET AND MANUFACTURING METHOD OF LIQUID CRYSTAL OPTICAL ELEMENT

(71) Applicant: FUJIFILM Corporation, Tokyo (JP)

(72) Inventors: Satoshi Nagano, Minamiashigara (JP); Makoto Kamo, Minamiashigara (JP); Yuki Saiki, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 153 days.

(21) Appl. No.: 19/020,868

(22) Filed: Jan. 14, 2025

(65) Prior Publication Data

US 2025/0155750 A1 May 15, 2025

Related U.S. Application Data

(63) Continuation of application No. PCT/JP2023/029554, filed on Aug. 16, 2023.

(30) Foreign Application Priority Data

Aug. 31, 2022 (JP) ................................ 2022-138180
Mar. 6, 2023 (JP) ................................ 2023-033838

(51) Int. Cl.
*G02F 1/1337* (2006.01)

(52) U.S. Cl.
CPC .............................. *G02F 1/133757* (2021.01)

(58) Field of Classification Search
None
See application file for complete search history.

(56) References Cited

U.S. PATENT DOCUMENTS 10,859,740 B2 12/2020 Escuti et al.
2012/0320323 A1* 12/2012 Kim ................. G02F 1/133753 349/134

(Continued)

FOREIGN PATENT DOCUMENTS

JP 2011-81231 A 4/2011
JP 2015-532468 A 11/2015

(Continued)

OTHER PUBLICATIONS

International Preliminary Report on Patentability and Written Opinion of the International Searching Authority (Forms PCT/IB/326, PCT/IB/373 and PCT/ISA/237) for International Application No. PCT/JP2023/029554, dated Mar. 13, 2025, with an English translation.

(Continued)

*Primary Examiner* — Phu Vu
(74) *Attorney, Agent, or Firm* — Birch, Stewart, Kolasch & Birch, LLP

(57) ABSTRACT

An object of the present invention is to provide a sheet capable of increasing uniformity of quality of a liquid crystal optical element manufactured by a batch process. Another object of the present invention is to provide a manufacturing method of a liquid crystal optical element. The sheet of the present invention is a sheet including a liquid crystal layer containing a liquid crystal compound, in which the liquid crystal layer has a plurality of liquid crystal alignment pattern regions having a liquid crystal alignment pattern in which an orientation of optical axes derived from the liquid crystal compound changes while continuously rotating in at least one in-plane direction, the plurality of liquid crystal alignment pattern regions are arranged to be spaced apart from each other in two directions orthogonal to each other in a plane of the liquid crystal layer, with a non-aligned region interposed between liquid crystal alignment pattern regions, two or more of the liquid crystal alignment pattern regions are arranged in each of the two directions in the liquid crystal layer, the non-aligned region is a region having no liquid crystal alignment pattern and no slow axis, an outer periphery of the liquid crystal alignment pattern region is surrounded by an outer peripheral region, the outer peripheral region is a region having no liquid crystal alignment pattern and having a slow axis, and a specified region including the liquid crystal alignment pattern region is capable of being cut out as a liquid crystal optical element.

20 Claims, 3 Drawing Sheets

(56) References Cited

U.S. PATENT DOCUMENTS

| | | | |
|---|---|---|---|
| 2015/0331167 | A1 | 11/2015 | Escuti et al. |
| 2021/0149255 | A1 | 5/2021 | Sato et al. |
| 2022/0390663 | A1 | 12/2022 | Sato et al. |

FOREIGN PATENT DOCUMENTS

| | | | |
|---|---|---|---|
| JP | 2017-522601 | A | 8/2017 |
| WO | WO 2020/022513 | A1 | 1/2020 |
| WO | WO 2021/157585 | A1 | 8/2021 |

OTHER PUBLICATIONS

International Search Report (Form PCT/ISA/210) for International Application No. PCT/JP2023/029554, dated Oct. 3, 2023, with English translation.

* cited by examiner

SHEET AND MANUFACTURING METHOD OF LIQUID CRYSTAL OPTICAL ELEMENT

CROSS-REFERENCE TO RELATED APPLICATIONS

This application is a Continuation of PCT International Application No. PCT/JP2023/029554 filed on Aug. 16, 2023, which claims priority under 35 U.S.C. § 119(a) to Japanese Patent Application No. 2022-138180 filed on Aug. 31, 2022 and Japanese Patent Application No. 2023-033838 filed on Mar. 6, 2023. The above applications are hereby expressly incorporated by reference, in their entirety, into the present application.

BACKGROUND OF THE INVENTION

1. Field of the Invention

The present invention relates to a sheet and a manufacturing method of a liquid crystal optical element.

2. Description of the Related Art

An optical element which controls a direction of light has been used in various optical devices or systems.

For example, the optical element which controls a direction of light is used in various optical devices, for example, a backlight of a liquid crystal display device, a head mounted display (HMD) such as augmented Reality (AR) glasses, virtual reality (VR) glasses, and mixed reality (MR) glasses, which display a virtual image, an image of various information, or the like to be superimposed on a scene that is actually being seen, a head up display (HUD), a projector, a beam steering device, or a sensor for, for example, detecting a thing and measuring the distance to a thing.

As the optical element which controls a direction of light, a liquid crystal optical element which is formed of a liquid crystal composition containing a liquid crystal compound and includes a liquid crystal layer exhibiting optical anisotropy has been proposed.

JP2015-532468A discloses an optical element including a birefringent material layer having local optical axis directions which vary in at least one direction along a surface thereof, in which the local optical axis directions correspond to optical axis direction profiles formed by varying polarization of light from a light source among a plurality of polarized light components, focusing the light from the light source into a spot at a focal plane, and scanning the spot in at least two dimensions along a surface of a polarization-sensitive recording medium arranged proximate to the focal plane such that neighboring scans spatially overlap, and varying the polarization and scanning the spot are performed independently.

JP2017-522601A discloses an optical element including a plurality of stacked birefringent sublayers configured to alter a direction of propagation of light transmitting therethrough according to a Bragg condition, in which the stacked birefringent sublayers respectively comprise local optical axes that vary along respective interfaces between adjacent ones of the stacked birefringent sublayers to define respective grating periods. JP2017-522601A discloses an optical element which diffracts transmitted light, in which light incident on a substrate (light guide plate) is diffracted by the optical element to be incident on the substrate at an angle at which the light is totally reflected in the substrate, and the light is guided in a direction substantially perpendicular to an incidence direction of the light in the substrate.

In a case where these optical elements are used as a near-eye display, a size thereof is a size of a few mm square to a size of 5 cm square or a diameter of approximately 5 cm at the largest.

SUMMARY OF THE INVENTION

In the related art, a phase difference plate, an optical compensation plate, and the like are known as a liquid crystal optical element formed of a liquid crystal material, and a method of mass-producing these liquid crystal optical elements in a short time with stable quality using a roll-to-roll process has been established. However, in the case of the liquid crystal optical element used in the above-described optical device, it is difficult to manufacture the liquid crystal optical element by applying the roll-to-roll process in the related art, because the optical design is complicated.

A method of manufacturing the liquid crystal optical element one by one by a batch process can also cope with the complicated optical design. However, in the method of manufacturing a liquid crystal optical element having a size of approximately 5 cm square or less by a batch process, there is a problem in uniformity of quality of the liquid crystal optical element to be manufactured, in addition to mass productivity.

An object of the present invention is to solve the above-described problem of the related art, and to provide a sheet capable of increasing uniformity of quality of a liquid crystal optical element manufactured by a batch process. Another object of the present invention is to provide a manufacturing method of a liquid crystal optical element.

In order to solve the problems, the present invention has the following configuration.

[1] A sheet comprising:

a liquid crystal layer containing a liquid crystal compound, in which the liquid crystal layer has a plurality of liquid crystal alignment pattern regions having a liquid crystal alignment pattern in which an orientation of optical axes derived from the liquid crystal compound changes while continuously rotating in at least one in-plane direction, the plurality of liquid crystal alignment pattern regions are arranged to be spaced apart from each other in two directions orthogonal to each other in a plane of the liquid crystal layer, with a non-aligned region interposed between liquid crystal alignment pattern regions, two or more of the liquid crystal alignment pattern regions are arranged in each of the two directions in the liquid crystal layer, the non-aligned region is a region having no liquid crystal alignment pattern and no slow axis, an outer periphery of the liquid crystal alignment pattern region is surrounded by an outer peripheral region, the outer peripheral region is a region having no liquid crystal alignment pattern and having a slow axis, and a specified region including the liquid crystal alignment pattern region is capable of being cut out as a liquid crystal optical element.

[2] The sheet according to [1], in which the outer periphery of the liquid crystal alignment pattern region includes a linear portion and a curved portion, and a minimum curvature radius of the curved portion is 0.2 mm or more.

[3] The sheet according to [2], in which at least one alignment mark indicating an outer periphery of the specified region or an optical center of the liquid crystal alignment pattern region is provided in the non-aligned region.

[4] The sheet according to any one of [1] to [3], in which the specified region is composed of the liquid crystal alignment pattern region and a part of the outer peripheral region.

[5] A sheet according to any one of [1] to [4], further comprising:

a support supporting the liquid crystal layer.

[6] A manufacturing method of a liquid crystal optical element, comprising:

a step of cutting out the specified region including the liquid crystal alignment pattern region from the sheet according to any one of [1] to [5].

[7] The manufacturing method of a liquid crystal optical element according to [6], in which, in the step, the specified region is cut out by cutting the sheet along a cut line including a linear portion and a curved portion, and a minimum curvature radius of the curved portion is 0.2 mm or more.

[8] The manufacturing method of a liquid crystal optical element according to [7], in which the cut line is included in any one of the outer peripheral region or the non-aligned region.

[9] The manufacturing method of a liquid crystal optical element according to [7] or [8], in which the cut line is included only in the outer peripheral region.

According to the present invention, it is possible to provide a sheet capable of increasing uniformity of quality of a liquid crystal optical element manufactured by a batch process. In addition, according to the present invention, it is possible to provide a manufacturing method of a liquid crystal optical element.

DESCRIPTION OF THE PREFERRED EMBODIMENTS

Hereinafter, the sheet and the manufacturing method of a liquid crystal optical element according to the embodiment of the present invention will be described in detail based on suitable embodiments shown in the accompanying drawings.

In the present specification, a numerical range represented by "to" means a range including numerical values before and after "to" as a lower limit value and an upper limit value.

In the present specification, "in-plane" is used to mean "inside a plane parallel to a surface (main surface) of a sheet or a liquid crystal optical element". In addition, "(any one) direction in a plane" is used to mean "(any one) direction parallel to the surface (main surface) of the sheet or the liquid crystal optical element".

In the present specification, visible light is light having a wavelength which can be seen by human eyes among electromagnetic waves, and refers to light in a wavelength range of 380 to 780 nm. Non-visible light refers to light in a wavelength range of less than 380 nm or more than 780 nm.

In the present specification, Re(λ) represents an in-plane retardation at a wavelength λ. Unless otherwise specified, the wavelength λ is 550 nm.

In the present specification, Re(λ) is a value measured at the wavelength λ using AxoScan (manufactured by Axometrics, Inc.). By inputting an average refractive index ((nx+ny+nz)/3) and a film thickness (d (μm)) to AxoScan, the following expression can be calculated.

Slow axis direction) (°)

Re(λ)=R0(λ)

R0(λ) is expressed as a numerical value calculated by AxoScan and represents Re(λ).

[Sheet]

Figure 1:
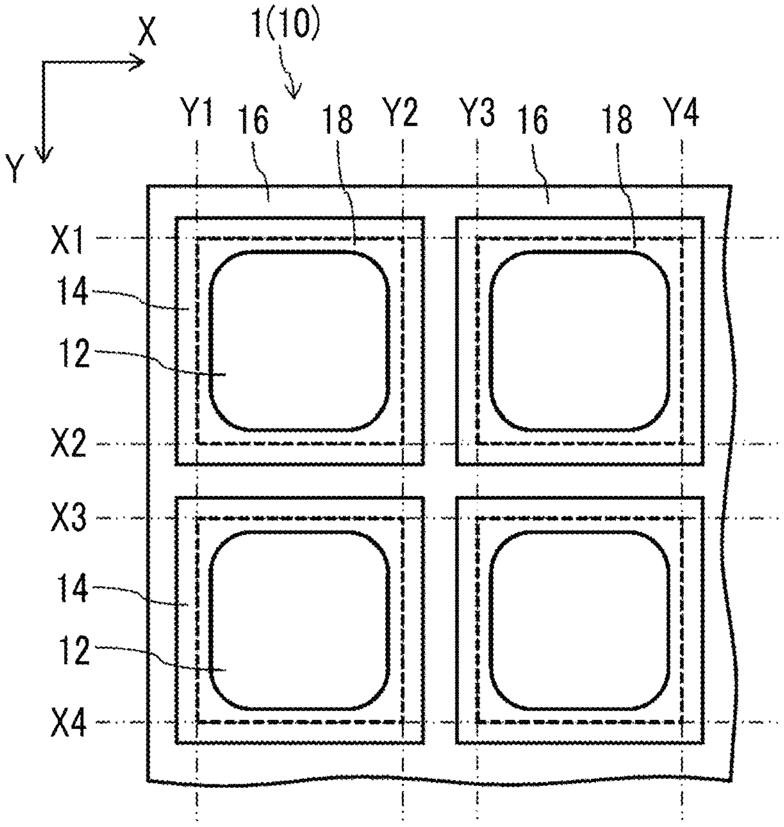
FIG. 1 is a plan view showing an example of a configuration of a sheet according to an embodiment of the present invention.

FIG. 1 conceptually shows an example of a configuration of the sheet according to the embodiment of the present invention. FIG. 1 is a plan view of a sheet 1 according to the embodiment of the present invention in a case of being observed from a normal direction of a surface (main surface).

In FIG. 1, both a direction indicated by an arrow X and a direction indicated by an arrow Y are in-plane directions of the sheet 1, and are orthogonal to each other. Hereinafter, the direction indicated by the arrow X and the direction indicated by the arrow Y will be referred to as "X direction" and "Y direction", respectively.

The sheet 1 according to the embodiment of the present invention shown in FIG. 1 includes a liquid crystal layer 10 containing a liquid crystal compound.

The liquid crystal layer 10 has a plurality of liquid crystal alignment pattern regions 12. Here, the liquid crystal alignment pattern region 12 has a liquid crystal alignment pattern in which an orientation of optical axes derived from the liquid crystal compound changes while continuously rotating in at least one in-plane direction (hereinafter, simply referred to as "liquid crystal alignment pattern").

The plurality of liquid crystal alignment pattern regions 12 are arranged to be spaced apart from each other in the X direction and the Y direction orthogonal to each other in the plane of the liquid crystal layer 10, with a non-aligned region 16 interposed therebetween. The non-aligned region 16 is a region having no liquid crystal alignment pattern and no slow axis.

In the liquid crystal layer 10, two or more liquid crystal alignment pattern regions 12 are arranged in each of the X direction and the Y direction.

An outer periphery of the liquid crystal alignment pattern region 12 is surrounded by an outer peripheral region 14. The outer peripheral region 14 is a region having no liquid crystal alignment pattern and having a slow axis.

In the liquid crystal layer 10 of the sheet 1 shown in FIG. 1, a specified region 18 including the liquid crystal alignment pattern region 12 is formed. The specified region 18 is configured to be capable of being cut out as a liquid crystal optical element. In the sheet 1, an outer periphery of the specified region 18 is composed of cut lines X1 to X4 and Y1 to Y4. By cutting the sheet 1 along the cut lines X1 to X4 and Y1 to Y4, a liquid crystal optical element corresponding to the specified region 18 is obtained.

As shown in the drawing, in the liquid crystal layer 10 of the sheet 1 according to the embodiment of the present invention, two or more liquid crystal alignment pattern regions 12 are arranged in each of the X direction and the Y direction orthogonal to each other. That is, the sheet 1 according to the embodiment of the present invention has at least four or more liquid crystal alignment pattern regions 12. The number of liquid crystal alignment pattern regions in the sheet according to the embodiment of the present invention may be 4 or more, but is not particularly limited.

As described above, by arranging a large number of specified regions 18 which include the liquid crystal alignment pattern region 12 functioning as an optically-anisotropic layer on the same surface of the sheet 1 and is capable of being cut out as a liquid crystal optical element, a plurality of liquid crystal optical elements can be collectively manufactured from the same sheet. That is, the sheet 1 according to the embodiment of the present invention is used as a multi-cutting sheet of liquid crystal optical elements. As compared with a case where a sheet including an individual optically-anisotropic layer is formed each time to manufacture each liquid crystal optical element, in a case where a plurality of liquid crystal optical elements are manufactured using the sheet 1 according to the embodiment of the present invention, even with a batch process, the thickness and quality of the optically-anisotropic layer of the manufactured liquid crystal optical element are common, and the variation in quality is suppressed. In addition, conditions such as temperature, humidity, pressurization caused by handling, and light are also made uniform for the plurality of liquid crystal optical elements formed from the sheet 1 according to the embodiment of the present invention, and thus a product having constant and stable quality can be provided.

In addition, in the sheet 1 according to the embodiment of the present invention, the plurality of liquid crystal alignment pattern regions 12 are aligned in two directions orthogonal to each other, and thus, in a case where the specified region 18 including the liquid crystal alignment pattern region 12 is separated to obtain each liquid crystal optical element, the specified region 18 can be more efficiently cut.

In addition, in the sheet 1 according to the embodiment of the present invention, as shown in FIG. 1, the plurality of liquid crystal alignment pattern regions 12 are arranged to be spaced apart from each other through the outer peripheral region 14 and the non-aligned region 16. By arranging the plurality of liquid crystal alignment pattern regions 12 in this way, a space for passing a cut line in a case where the specified region 18 is separated as an individual sheet body as a liquid crystal optical element is generated, and the liquid crystal alignment pattern functioning as a liquid crystal optical element can be prevented from being damaged, and stable quality can be maintained.

Furthermore, in the sheet 1 according to the embodiment of the present invention, the outer periphery of each of the liquid crystal alignment pattern regions 12 is surrounded by the outer peripheral region 14. As a result, the quality and the uniformity of quality of the liquid crystal optical element cut out from the same sheet can be improved as compared with a sheet in which the outer peripheral region is not provided around the liquid crystal alignment pattern region and only the non-aligned region is disposed between two liquid crystal alignment pattern regions in close contact with each other. In a case where the outer peripheral region is not provided around the liquid crystal alignment pattern region, since the liquid crystal compound is randomly aligned in the non-aligned region, in a region in the vicinity of the outer periphery in the liquid crystal alignment pattern region in contact with the non-aligned region, the alignment of the liquid crystal compound is disturbed, and desired optical characteristics cannot be obtained. On the other hand, the liquid crystal compound in the outer peripheral region 14 is not regularly aligned as in the formed liquid crystal alignment pattern, but the alignment order is maintained to the extent that a slow axis is provided, and thus the disorder of the alignment of the liquid crystal compound in the region of the liquid crystal alignment pattern region 12 near the outer periphery in contact with the outer peripheral region 14 can be suppressed, and a regular liquid crystal alignment pattern can be maintained.

Hereinafter, the configuration of the sheet according to the embodiment of the present invention will be described in more detail.

In the following description, the term "liquid crystal optical element" means "liquid crystal optical element manufactured by cutting out the above-described specified region including the liquid crystal alignment pattern from the sheet according to the embodiment of the present invention", unless otherwise specified.

[Liquid Crystal Alignment Pattern Region]

The liquid crystal alignment pattern region 12 is a region having a liquid crystal alignment pattern in which an orientation of optical axes derived from the liquid crystal compound changes while continuously rotating in at least one in-plane direction, and a plurality of the liquid crystal alignment pattern regions 12 are formed in the liquid crystal layer 10.

An outer periphery of the liquid crystal alignment pattern region 12 shown in FIG. 1 is composed of four linear portions and four curved portions.

As shown in FIG. 1, the outer periphery of the liquid crystal alignment pattern region includes a linear portion and a curved portion, and thus the liquid crystal compound can be smoothly aligned along the outer periphery as compared with a case where the outer periphery consists of only linear portion, and the occurrence of alignment defects in the liquid crystal alignment pattern functioning as an optically-anisotropic layer can be suppressed.

The minimum curvature radius of the curved portion is preferably 0.2 mm or more, and more preferably 0.4 mm or more. The upper limit value thereof is not particularly limited, but is, for example, 20 mm or less, preferably 10 mm or less.

The outer periphery of the liquid crystal alignment pattern region 12 shown in FIG. 1 has a shape in which a curved portion consisting of an arc of a sector is formed at four vertices of a quadrangle; but the shape of the liquid crystal alignment pattern region in the liquid crystal layer of the sheet according to the embodiment of the present invention is not limited to the shape, and may be, for example, a circle, an ellipse, a polygonal shape including the quadrangle, and a shape in which at least a part of the vertices of the polygon is replaced with a curve.

Figure 2:
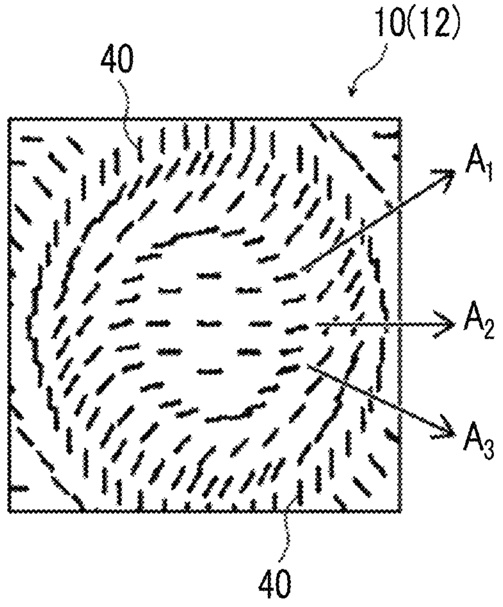
FIG. 2 is a plan view showing an example of a configuration of a liquid crystal alignment pattern region of the sheet according to the embodiment of the present invention.

FIG. 2 conceptually shows an example of the configuration of the liquid crystal alignment pattern region of the sheet according to the embodiment of the present invention.

The liquid crystal alignment pattern region 12 shown in FIG. 2 is one of the plurality of liquid crystal alignment pattern regions 12 arranged in the liquid crystal layer 10 of the sheet according to the embodiment of the present invention. In the liquid crystal optical element obtained by cutting out the specified region including the liquid crystal alignment pattern region 12 from the sheet according to the embodiment of the present invention, the liquid crystal alignment pattern region 12 functions as an optically-anisotropic layer. The liquid crystal optical element obtained by cutting out the specified region including the liquid crystal alignment pattern region 12 shown in FIG. 2 is also referred to as a liquid crystal diffraction element because the optically-anisotropic layer exhibits a function of diffracting incidence light.

The liquid crystal alignment pattern region 12 is formed of a composition containing a liquid crystal compound, and has a predetermined liquid crystal alignment pattern in which an optical axis derived from the liquid crystal compound changes while continuously rotating in at least one in-plane direction.

In the example shown in FIG. 2, the liquid crystal alignment pattern region 12 has a radial liquid crystal alignment pattern that the one in-plane direction (directions indicated by arrows $A_1$ to $A_3$) in which the orientation of the optical axes derived from the liquid crystal compound 40 changes while continuously rotating is present in a radial shape from an inner side toward an outer side. In the liquid crystal alignment pattern, a line connecting the liquid crystal compounds in which the optical axes face the same direction is circular, and a plurality of circular line segments are concentrically arranged.

In the liquid crystal alignment pattern region 12 shown in FIG. 2, the optical axis derived from the liquid crystal compound 40 is a longitudinal direction of the liquid crystal compound 40.

In the liquid crystal alignment pattern region 12 shown in FIG. 2, the orientation of the optical axes derived from the liquid crystal compound 40 changes while continuously rotating in a plurality of directions from the center of the liquid crystal alignment pattern region 12 toward the outer side, for example, along the direction indicated by the arrow $A_1$, the direction indicated by the arrow $A_2$, and the direction indicated by the arrow $A_3$. The arrow $A_1$, the arrow $A_2$, and the arrow $A_3$ are arrangement axes described later.

In the liquid crystal alignment pattern of the liquid crystal alignment pattern region 12, the optical axes derived from the liquid crystal compound change while continuously rotating in at least one in-plane direction. Therefore, in a case where light is incident into the liquid crystal optical element and transmits through the liquid crystal alignment pattern region 12, the light is diffracted (bent) in the above-described one direction. The action of the diffraction depends on a length (period Λ) over which the orientation of the optical axes derived from the liquid crystal compound rotates by 180° in a plane in the liquid crystal alignment pattern, and a diffraction angle increases as the period Λ decreases.

In the example shown in FIG. 2, the liquid crystal alignment pattern region 12 has a radial liquid crystal alignment pattern. Therefore, in a case where the liquid crystal alignment pattern in which an azimuth direction of the incidence light is diffracted toward the center side is formed along each of the arrangement axes ($A_1$ to $A_3$ and the like), the transmitted light of the liquid crystal optical element can be collected. Alternatively, in a case where the liquid crystal alignment pattern in which an azimuth direction of the incidence light is diffracted toward the outer side is formed along each of the arrangement axes ($A_1$ to $A_3$), the transmitted light of the liquid crystal optical element can be diffused. Whether or not the transmitted light is diffracted toward the center side or diffracted toward the outer side depends on a polarization state of the incidence light and a rotation direction of the optical axes in the liquid crystal alignment pattern.

In addition, the period Λ of the liquid crystal alignment pattern in the liquid crystal alignment pattern region 12 gradually changes in one direction. In the example shown in FIG. 2, the period Λ of the liquid crystal alignment pattern gradually decreases from the center toward the outer side.

As described above, the liquid crystal alignment pattern region 12 formed of a composition containing a liquid crystal compound and having the liquid crystal alignment pattern in which the direction of the optical axes derived from the liquid crystal compound changes while continuously rotating in the arrangement axis direction diffracts light, but as the period Λ of the liquid crystal alignment pattern decreases, the diffraction angle increases. Therefore, in a case where the liquid crystal alignment pattern is formed such that the periods Λ are different in different regions in a plane, light incident into the different regions in a plane is diffracted at different angles.

For example, in a case where the liquid crystal alignment pattern in the liquid crystal alignment pattern region 12 is radial as in the example shown in FIG. 2, by shortening the period Λ of the liquid crystal alignment pattern from the center side toward the outer side of the liquid crystal alignment pattern region 12, in the liquid crystal optical element, light incident into an end portion side further outside than light incident into the vicinity of the center of the liquid crystal alignment pattern region 12 can be diffracted more. The liquid crystal optical element having such a liquid crystal alignment pattern functions more suitably as, for example, a condenser lens which collects light.

The presence or absence and the shape of the above-described liquid crystal alignment pattern region in the liquid crystal layer can be confirmed by observing the liquid crystal layer with an optical microscope.

Figure 3:
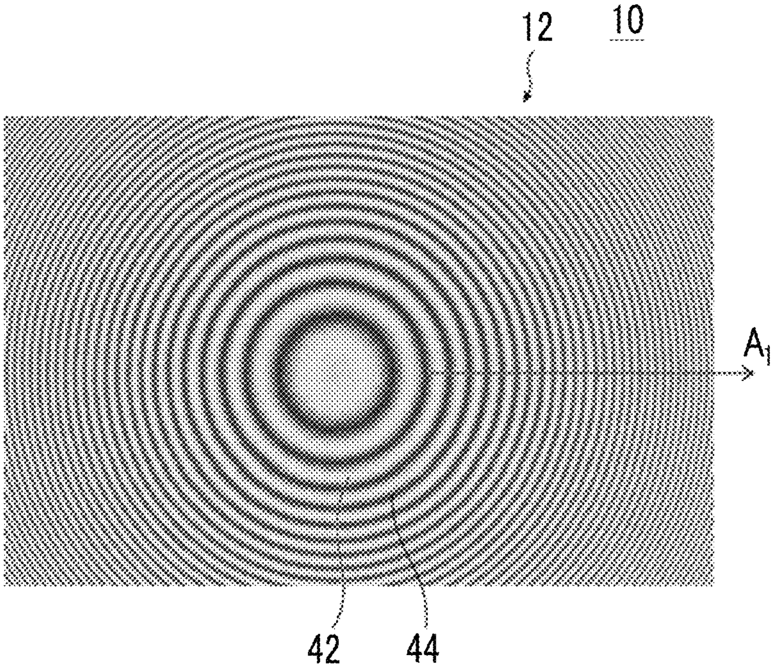
FIG. 3 is a conceptual diagram showing an example of an image obtained by observing the liquid crystal alignment pattern region of the sheet according to the embodiment of the present invention with an optical microscope.

FIG. 3 conceptually shows an example of an image obtained by observing the liquid crystal alignment pattern region of the sheet according to the embodiment of the present invention with an optical microscope. The conceptual diagram shown in FIG. 3 corresponds to an image obtained by observing the liquid crystal alignment pattern region 12 in the liquid crystal layer 10 shown in FIG. 2 using an optical microscope.

As shown in FIG. 3, in an observation image of the liquid crystal alignment pattern region 12, obtained using the optical microscope, a stripe pattern in which bright lines 42 and dark lines 44 are alternately arranged appears. In a region where such a stripe pattern is observed, it can be said that the liquid crystal alignment pattern in which the orientation of the optical axes derived from the liquid crystal compound changes while continuously rotating in at least one in-plane direction is formed.

On the other hand, in a region where the liquid crystal alignment pattern is not formed (for example, the outer peripheral region and the non-aligned region of the sheet according to the embodiment of the present invention), the stripe pattern consisting of the bright lines and the dark lines does not appear in the observation image obtained using the optical microscope.

By the above-described method, in the liquid crystal layer of the sheet according to the embodiment of the present invention, the liquid crystal alignment pattern region and the region other than the liquid crystal alignment pattern region (the outer peripheral region and the non-aligned region) can be distinguished from each other.

[Outer Peripheral Region]

The outer peripheral region 14 is a region which does not have a liquid crystal alignment pattern and has a slow axis. The liquid crystal compound contained in the outer peripheral region 14 is not regularly aligned as in the liquid crystal compound contained in the liquid crystal alignment pattern region 12, and is aligned in a direction substantially close to the alignment direction of the liquid crystal compound in the periphery.

In the sheet 1 (liquid crystal layer 10) shown in FIG. 1, the outer peripheral region 14 is disposed to surround each of the plurality of the liquid crystal alignment pattern regions 12. That is, in the liquid crystal layer 10, a plurality of outer peripheral regions 14, each of which is a side edge portion surrounding the liquid crystal alignment pattern region 12, are arranged to be spaced apart from each other in the X direction and the Y direction orthogonal to each other in a plane, with the non-aligned region 16 interposed therebetween, and two or more outer peripheral regions 14 are arranged in each of the X direction and the Y direction.

The presence or absence of the outer peripheral region in the liquid crystal layer can be confirmed by the following method.

A laminate formed by disposing a sheet between two polarizing plates in a crossed nicols arrangement is observed with a polarization microscope. In this case, the laminate is observed while rotating the sheet in a plane. From the observation, it can be said that a region where phenomenon that the bright field in which the brightness is maximized and the dark field in which the brightness is minimized are repeated appears each time the sheet is rotated by 90° is a region having a slow axis (birefringence).

In a case where the liquid crystal alignment pattern region of the sheet according to the embodiment of the present invention is observed by the above-described method, a rainbow-colored stripe pattern in which brightness does not change during the rotation of the sheet is observed. In addition, in a case where the non-aligned region of the sheet according to the embodiment of the present invention is observed by the above-described method, an image which is uniformly bright in a plane and in which brightness does not change during the rotation of the sheet is observed.

By comparing the observation result of the region having the liquid crystal alignment pattern using an optical microscope with the observation result of the above-described region having a slow axis, it is possible to confirm whether or not the region having a slow axis is present on the outer periphery of the region having the liquid crystal alignment pattern, and thus it is possible to confirm the presence or absence of the outer peripheral region of the sheet according to the embodiment of the present invention.

The outer peripheral region surrounding the liquid crystal alignment pattern region can be obtained, for example, by forming a liquid crystal layer using an alignment film which is formed by irradiating a photo-alignment material contained in an alignment film used for forming a liquid crystal layer with polarized light such that the alignment film has an opening portion corresponding to the shape of the liquid crystal alignment pattern region and the liquid crystal layer is formed through a mask spaced apart from the alignment film.

In addition, the outer peripheral region can also be obtained by obtaining an alignment film in which the outer peripheral region can be formed by adjusting a polarization degree and/or an irradiation amount of polarized irradiation with which the region of the alignment film corresponding to the outer peripheral region is irradiated, and forming a liquid crystal layer using the alignment film.

[Non-Aligned Region]

The non-aligned region 16 is a region which does not have a liquid crystal alignment pattern and does not have a slow axis. That is, the liquid crystal compound contained in the non-aligned region 16 is not aligned, and the orientation of the optical axes derived from the liquid crystal compound is random.

In the sheet 1 (liquid crystal layer 10) shown in FIG. 1, the non-aligned region 16 consists of a plurality of strip-shaped regions extending in the X direction and the Y direction, respectively. Although the liquid crystal alignment pattern region 12 is spaced apart from the other liquid crystal alignment pattern regions 12 the outer peripheral region 14 is spaced apart from the other outer peripheral regions 14, the non-aligned region 16 is continuous.

The presence or absence of the non-aligned region in the liquid crystal layer can be confirmed by the above-described method for confirming the liquid crystal alignment pattern region and the above-described method for confirming the outer peripheral region. The non-aligned region is a region in which a stripe pattern shown by the liquid crystal alignment pattern is not observed even in a case of being observed according to the above-described method for confirming the liquid crystal alignment pattern region, and an image which is uniformly bright in a plane and in which brightness does not change during the rotation of the sheet is observed in a case of being observed according to the above-described method for confirming the outer peripheral region.

The non-aligned region surrounding the outer peripheral region in the liquid crystal layer can be formed, for example, by setting an irradiation range such that a region of the alignment film corresponding to the non-aligned region is not irradiated with polarized light, in the case where the alignment film used for forming the liquid crystal layer is irradiated with polarized light.

An alignment mark serving as a mark indicating a predetermined position may be provided in the non-aligned region.

Examples of the alignment mark include a mark indicating an outer periphery of the specified region which is an outer periphery of the liquid crystal optical element. Since the alignment mark indicates the outer periphery of the specified region, in a case of cutting out the liquid crystal optical element from the sheet, it is easy to detect the position of the cut line, and it is possible to manufacture a liquid crystal optical element having a smaller error from the designed shape.

The alignment mark may be a mark indicating an optical center of the liquid crystal alignment pattern region. In a case where the liquid crystal optical element is cut out from the sheet, the alignment mark indicates the position of the optical center of the liquid crystal alignment pattern region, and thus the position of the cut line can be set based on the indicated position, and it is possible to manufacture a liquid crystal optical element having a smaller error from the designed shape.

A shape of the alignment mark may be any shape such as a cross, a dot, a straight line, a circle, and a quadrangle. The alignment mark may be an aggregate or may be a lattice shape.

The number of alignment marks used for indicating the position of the target is not particularly limited, and only one alignment mark may be used according to the target, or a plurality of alignment marks may be used in combination. In addition, a plurality of positions of targets may be indicated by using a combination of a plurality of alignment marks.

The alignment mark may be, for example, a region where the optical axis derived from the liquid crystal compound contained in the liquid crystal layer is aligned in a predetermined direction as a whole. Such an alignment mark can be formed by irradiating a position corresponding to the alignment mark with polarized light in a case where a photo-alignment material contained in an alignment film used for forming a liquid crystal layer is aligned by irradiation with polarized light.

[Specified Region]

As shown in FIG. 1, the specified region 18 includes the liquid crystal alignment pattern region 12, and is configured to be capable of being cut out as a liquid crystal optical element. In other words, an element obtained by cutting along the outer periphery of the specified region 18 can be used as a liquid crystal optical element due to the liquid crystal alignment pattern region 12 functioning as an optically-anisotropic layer.

In the sheet 1 shown in FIG. 1, a plurality of liquid crystal alignment pattern regions 12 are arranged to be spaced apart from each other, and each of the liquid crystal alignment pattern regions 12 is included in the specified region 18. Therefore, it is also possible to manufacture a plurality of liquid crystal optical elements from the sheet 1 by cutting along the outer periphery of the specified region 18.

In addition, in the sheet according to the embodiment of the present invention, the outer periphery of the specified region including the liquid crystal alignment pattern region, which can be cut out as a liquid crystal optical element, may be included in any one of the outer peripheral region or the non-aligned region. Since the outer peripheral region is a region where an alignment degree of the liquid crystal compound is low and the non-aligned region is a region where the liquid crystal compound is not aligned, by cutting along the above-described outer periphery, it is possible to suppress occurrence of breakage in an unintended direction at the end part of the liquid crystal optical element cut out. As a result, a plurality of liquid crystal optical elements having improved quality and uniformity of quality can be manufactured from the same sheet by a batch process. On the other hand, in a case where a region where optically-anisotropic layers having a liquid crystal alignment pattern are continuous is cut in order to manufacture a plurality of liquid crystal optical elements from the same sheet, since the liquid crystal compound is regularly aligned in a certain direction in the optically-anisotropic layer, depending on the cutting direction and the alignment direction of the liquid crystal compound, breakage or defects may occur along a direction different from the cutting direction, and the quality of the liquid crystal optical element may be deteriorated.

The specified region 18 shown in FIG. 1 is composed of the liquid crystal alignment pattern region 12 and a part of the outer peripheral region 14 surrounding the liquid crystal alignment pattern region 12.

The specified region of the sheet according to the embodiment of the present invention is not limited to the aspect shown in FIG. 1 as long as the specified region includes the liquid crystal alignment pattern region. For example, the specified region may be composed of only the liquid crystal alignment pattern region, may further include at least a part of the outer peripheral region, or may further include a part of the non-aligned region. In a case where the specified region includes a part of the non-aligned region, at least a part of the outer peripheral region is included.

Figure 4:
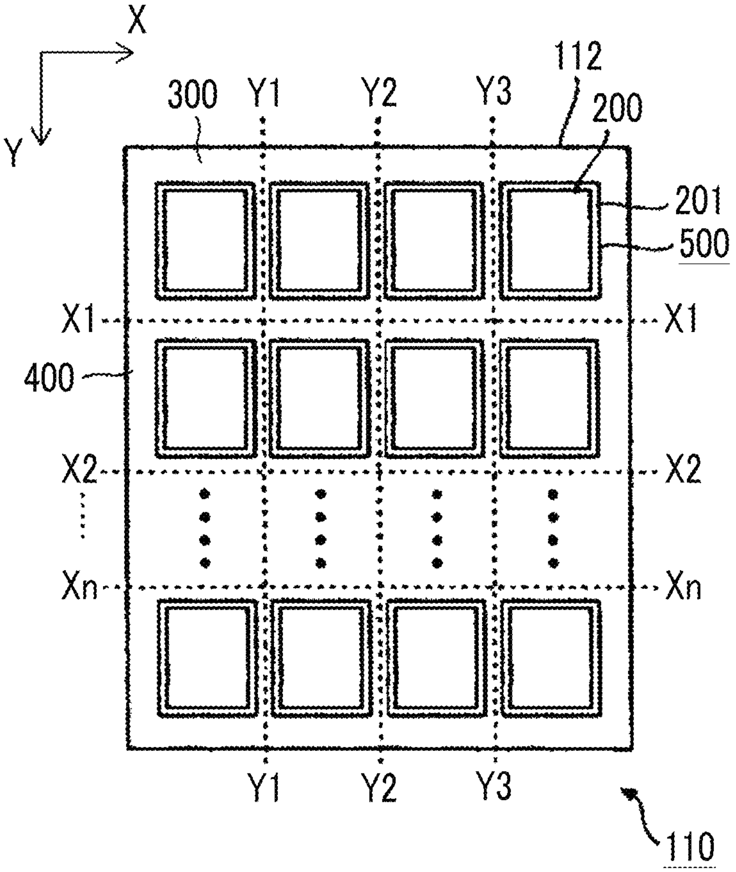
FIG. 4 is a plan view showing another example of the configuration of the sheet according to the embodiment of the present invention.

FIG. 4 conceptually shows another example of the configuration of the sheet according to the embodiment of the present invention. FIG. 4 is a plan view of a sheet 110 according to the embodiment of the present invention in a case of being observed from a normal direction of a surface (main surface).

The sheet 110 includes a liquid crystal layer (not shown) containing a liquid crystal compound, in which the liquid crystal layer has a plurality of liquid crystal alignment pattern regions 200 having a liquid crystal alignment pattern in which an orientation of optical axes derived from the liquid crystal compound changes while continuously rotating in at least one in-plane direction. The liquid crystal alignment pattern region 200 functions as an optically-anisotropic layer in the liquid crystal optical element obtained by cutting out from the sheet 110.

In the sheet 110, the plurality of liquid crystal alignment pattern regions 200 are arranged to be spaced apart from each other in the X direction and the Y direction orthogonal to each other in a plane. In the sheet 110 shown in FIG. 4, the number of liquid crystal alignment pattern regions 200 arranged in the X direction is 4, and the number of liquid crystal alignment pattern regions 200 arranged in the Y direction is (n+1). As described above, the number of liquid crystal alignment pattern regions in the sheet according to the embodiment of the present invention may be 2 or more in each of two orthogonal directions, and may be 4 or more in total.

An outer periphery of the liquid crystal alignment pattern region 200 is surrounded by an outer peripheral region 201 which does not have a liquid crystal alignment pattern and has a slow axis. The plurality of outer peripheral regions 201 surrounding the plurality of liquid crystal alignment pattern regions 200 are arranged to be spaced apart from each other in the X direction and the Y direction. That is, an outer peripheral edge 500 of one outer peripheral region 201 is spaced apart from an outer peripheral edge 500 of the other outer peripheral region 201.

A non-aligned region 300 is disposed between the plurality of outer peripheral regions 201 in the sheet 110, and is a region which does not have a liquid crystal alignment pattern and a slow axis.

In addition, in the sheet 110, a specified region 400 including the liquid crystal alignment pattern region 200 is formed. Four sides of the specified region 400 are composed of an edge 112 of the sheet 110 and any of cut lines X1 to Xn and Y1 to Y3. Each of the specified regions 400 can be used as a liquid crystal optical element by cutting the sheet 110 along the cut lines X1 to Xn and Y1 to Y3.

In the sheet 110 according to the embodiment of the present invention shown in FIG. 4, the plurality of liquid crystal alignment pattern regions 200, the plurality of outer peripheral regions 201, and the non-aligned region 300 are arranged as described above. Therefore, a space for passing the cut lines X1 to Xn and Y1 to Y3 in a case where the liquid crystal optical element is separated as an individual sheet body is generated, and a liquid crystal optical element having excellent quality can be stably manufactured without damaging the optically-anisotropic layer. Accordingly, the sheet 110 can be used as a multi-cutting sheet of liquid crystal optical elements.

A thickness of the liquid crystal layer in the sheet according to the embodiment of the present invention is appropriately set depending on the use of the liquid crystal optical element, the material for forming the liquid crystal layer, and the like; and is preferably 3 μm or less, more preferably 1.0 to 2.9 μm, and still more preferably 1.5 to 2.8 μm.

By setting the thickness of the liquid crystal layer to 3 μm or less, viewing angle characteristics of the liquid crystal optical element can be widened.

[Support]

The sheet may further include a support supporting the liquid crystal layer.

As the support, various sheet-like materials (including films and plate-like materials) can be used as long as they can support the liquid crystal layer.

The support may be single-layered or multi-layered.

Examples of the single-layered support include a support formed of glass, triacetyl cellulose (TAC), polyethylene terephthalate (PET), polycarbonates, polyvinyl chloride, acryl, polyolefin, and the like. Examples of the multi-layered support include a multilayer which includes any of the above-described single-layered supports as a substrate and has other layers provided on a surface of the substrate.

In the support, a transmittance with respect to light diffracted by the liquid crystal alignment pattern region is preferably 50% or more, more preferably 70% or more, and still more preferably 85% or more.

A thickness of the support is not particularly limited, and the thickness may be appropriately set to a thickness capable of holding the liquid crystal layer, and an alignment film or an adhesive layer provided as necessary, depending on the use of the liquid crystal optical element, the material for forming the support, and the like.

The thickness of the support is preferably 1 to 1,000 μm, more preferably 3 to 250 μm, and still more preferably 5 to 150 μm.

In a case where the sheet according to the embodiment of the present invention is manufactured by forming the liquid crystal layer on the support using a composition for forming a liquid crystal layer, an alignment film may be provided between the support and the liquid crystal layer. In addition, in a case where a liquid crystal layer separately manufactured is provided on the support by transfer or the like, an adhesive layer may be provided between the support and the liquid crystal layer.

[Manufacturing Method of Sheet]

A manufacturing method of the sheet according to the embodiment of the present invention is not particularly limited as long as it is a method of forming a liquid crystal layer having the above-described regions arranged as described above. Examples of the method for manufacturing the sheet include a method of forming an alignment film having a predetermined alignment restriction force on a support, laminating a composition for forming a liquid crystal layer (hereinafter, also referred to as "liquid crystal composition"), containing a liquid crystal compound, on the alignment film, and immobilizing the alignment of the liquid crystal compound contained in the laminated coating film.

From the viewpoint of improving the uniformity of quality of the liquid crystal optical element, it is preferable that the alignment films corresponding to the different regions of the liquid crystal layer are common. That is, it is preferable that a liquid crystal layer having a plurality of liquid crystal alignment pattern regions, an outer peripheral region, and a non-aligned region is formed on a coating film (alignment film) obtained by applying the same composition for forming an alignment film onto the support.

More specifically, the sheet according to the embodiment of the present invention can be manufactured by going through, in the following order, an alignment film-forming step of forming an alignment film having an alignment pattern for forming each of liquid crystal optical elements by applying a composition for forming an alignment film to a support to form a common coating film and imparting an alignment restriction force to the coating film, and a liquid crystal layer-forming step of forming a common coating film by applying a liquid crystal composition to the alignment film, forming a liquid crystal alignment pattern by the alignment restriction force of the alignment film and the alignment forming ability of the liquid crystal compound, and fixing the liquid crystal alignment pattern to form a liquid crystal layer. In the liquid crystal layer-forming step, the application of the liquid crystal composition and the formation and fixing of the liquid crystal alignment pattern may be repeated a plurality of times to form a laminate including a plurality of layers.

Hereinafter, each of the alignment film-forming step and the liquid crystal layer-forming step will be described in detail.

<Alignment Film-Forming Step>

The alignment film-forming step is a step of forming an alignment film having a predetermined alignment pattern for forming a liquid crystal layer having the liquid crystal alignment pattern in a predetermined in-plane region on the alignment film.

As the alignment film, a so-called photo-alignment film which is formed by irradiating, with polarized light or non-polarized light, a coating film containing a photo-alignable material applied onto a support is suitably used.

As the support for forming the alignment film, the above-described support mentioned as the support for supporting the liquid crystal layer can be used.

As the alignment film, various known materials can be used. Preferred examples of the photo-alignment material for forming the alignment film an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H09-118717A), JP1998-506420A (JP-H10-506420A), JP2003-505561A, WO2010/150748A, JP2013-177561A, and JP2014-012823A.

Among these, an azo compound, a photocrosslinking polyimide, a photocrosslinking polyamide, a photocrosslinking polyester, a cinnamate compound, or a chalcone compound is suitability used.

A thickness of the alignment film formed by the alignment film-forming step is not particularly limited, and the thickness with which the required alignment performance can be obtained may be appropriately set depending on the material for forming the alignment film.

The thickness of the alignment film is, for example, 0.01 to 5 μm, preferably 0.05 to 2 μm.

A method of imparting the alignment restriction force to the above-described material is not particularly limited, and various known methods depending on the material for forming the alignment film can be used.

As the method of imparting the alignment restriction force, photo alignment is preferable. That is, the irradiation of polarized light can be performed in a direction perpendicular or oblique to the photo-alignment film, and the irradiation of non-polarized light can be performed in a direction oblique to the photo-alignment film.

Examples of the alignment film-forming step include a method including applying the alignment film to a surface of the support, drying the applied alignment film, and exposing the alignment film to laser light to form an alignment pattern.

Figure 5:
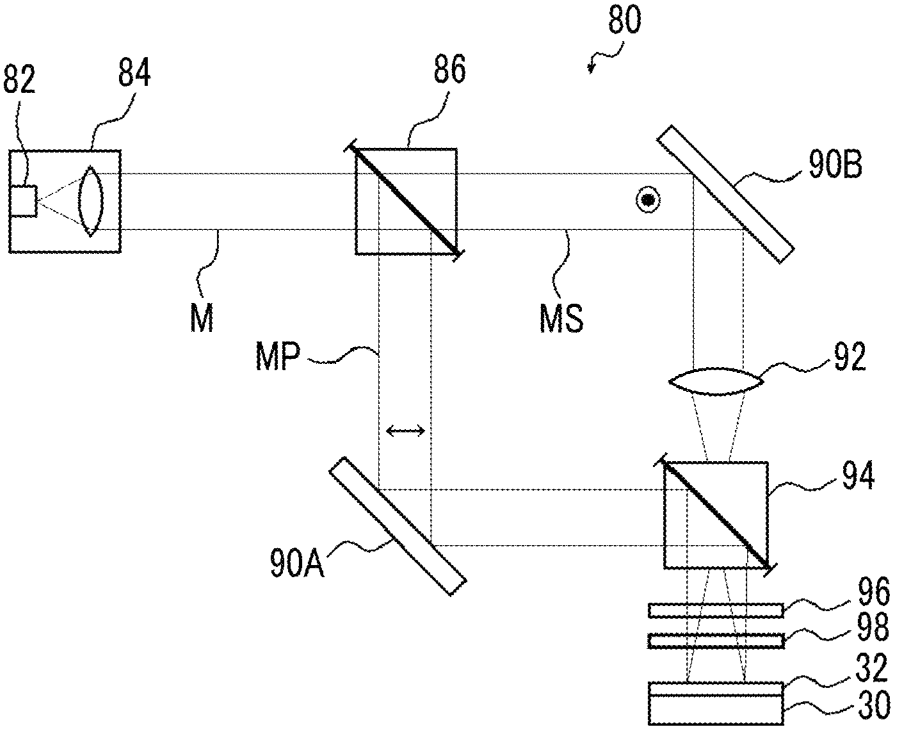
FIG. 5 is a conceptual diagram showing an example of an exposure device which exposes an alignment film to form an alignment pattern.

FIG. 5 conceptually shows an example of an exposure device which exposes the alignment film to form, in the liquid crystal layer, a concentric circular alignment pattern for forming the liquid crystal alignment pattern as shown in FIG. 1.

An exposure device 80 shown in FIG. 5 includes a light source 84 which includes a laser 82, a polarization beam splitter 86 which splits a laser light M emitted from the laser 82 into an S-polarized light MS and a P-polarized light MP, a mirror 90A which is disposed on an optical path of the P-polarized light MP and a mirror 90B which is disposed on an optical path of the S-polarized light MS, a lens 92 which is disposed on the optical path of the S-polarized light MS, a polarization beam splitter 94, a λ/4 plate 96, and a mask 98.

The P-polarized light MP which is split by the polarization beam splitter 86 is reflected from the mirror 90A to be incident into the polarization beam splitter 94. On the other hand, the S-polarized light MS which is split by the polarization beam splitter 86 is reflected from the mirror 90B and is collected by the lens 92 to be incident into the polarization beam splitter 94.

The P-polarized light MP and the S-polarized light MS are multiplexed by the polarization beam splitter 94, converted into dextrorotatory circularly polarized light and levorotatory circularly polarized light by the λ/4 plate 96 depending on the polarization direction, and further pass through an opening portion (not shown) of the mask 98 to be incident into a region (hereinafter, also referred to as “alignment region”) corresponding to an opening portion of the mask 98 in an alignment film 32 on a support 30.

Due to interference between the dextrorotatory circularly polarized light and the levorotatory circularly polarized light, the polarization state of light with which the alignment film 32 is irradiated periodically changes according to interference fringes. An intersecting angle between dextrorotatory circularly polarized light and levorotatory circularly polarized light changes from the inside to the outside of the concentric circle, so that an exposure pattern in which the pitch changes from the inner side toward the outer side can be obtained. By such interference exposure, a concentric circular alignment pattern in which the alignment state periodically changes is obtained in the alignment region of the alignment film 32.

In the exposure device 80, the length Λ of the single period in the liquid crystal alignment pattern in which the optical axis of the liquid crystal compound continuously rotates by 180° can be controlled by changing the refractive power of the lens 92 (F number of the lens 92), the focal length of the lens 92, the distance between the lens 92 and the alignment film 32, and the like.

In addition, by adjusting the focal power of the lens 92, the length Λ of the single period in the liquid crystal alignment pattern in the one direction, in which the optical axis of the liquid crystal compound continuously rotates, can be changed. Specifically, the length Λ of the single period in the liquid crystal alignment pattern in the one direction, in which the optical axis of the liquid crystal compound continuously rotates, can be changed depending on a light spread angle at which light is spread by the lens 92 due to interference with parallel light. More specifically, in a case where the focal power of the lens 92 is decreased, the light is close to the parallel light, so that the length Λ of the single period in the liquid crystal alignment pattern is gradually decreased from the inner side toward the outer side, and the F-number is increased. Conversely, in a case where the focal power of the lens 92 is stronger, the length Λ of the single period in the liquid crystal alignment pattern rapidly decreases from the inner side toward the outer side, and the F number is decreased.

In the exposure device 80, the mask 98 has an opening portion which restricts irradiation ranges of the dextrorotatory circularly polarized light and the levorotatory circularly polarized light in the alignment film 32. In a case where the dextrorotatory circularly polarized light and the levorotatory circularly polarized light pass through the opening portion of the mask 98, the dextrorotatory circularly polarized light and the levorotatory circularly polarized light are irradiated and laminated in the alignment region of the alignment film 32, and an alignment pattern capable of forming a liquid crystal alignment pattern is formed in the liquid crystal layer. On the other hand, the dextrorotatory circularly polarized light and the levorotatory circularly polarized light are shielded by the mask 98 in the region of the alignment film 32 other than the alignment region, and thus the alignment restriction force capable of forming the liquid crystal alignment pattern is not imparted.

The size and shape of the opening portion of the mask 98 are appropriately selected depending on the size and shape of the alignment region in which the alignment pattern is formed in the alignment film 32, that is, the size and shape of the liquid crystal alignment pattern region formed in the liquid crystal layer.

In the exposure device 80 shown in FIG. 5, the mask 98 is installed at a position separated from the alignment film 32. In a case where the alignment film 32 is exposed using the exposure device 80, the alignment film 32 is exposed to light which passes through the opening portion of the mask 98 separated from the alignment film 32, so that a low alignment restriction force is applied to the photo-alignment material contained in the region surrounding the outer periphery of the alignment region of the alignment film 32, and the outer peripheral region surrounding the outer periphery of the liquid crystal alignment pattern region can be easily formed in the liquid crystal layer to be laminated.

A distance between the mask 98 and the alignment film 32 is appropriately selected depending on the size and shape of the region for forming the outer peripheral region in the alignment film 32 (that is, the size and shape of the outer peripheral region formed in the liquid crystal layer), the size of the alignment region, the size and shape of the opening portion of the mask 98, the size and shape of the alignment region formed in the alignment film 32, and the like.

By repeatedly forming the alignment pattern in each of two orthogonal directions in a plane of the alignment film formed on the support according to the above-described method, the alignment film used for manufacturing the sheet according to the embodiment of the present invention can be formed.

The exposure method in the alignment film-forming step is not limited to the above-described method, and various exposure methods capable of forming the alignment film capable of forming a plurality of liquid crystal alignment pattern regions and a plurality of outer peripheral regions on the liquid crystal layer to be laminated can be adopted.

In the alignment film-forming step, the alignment film may be formed by exposing the alignment film by a direct drawing method.

Figure 6:
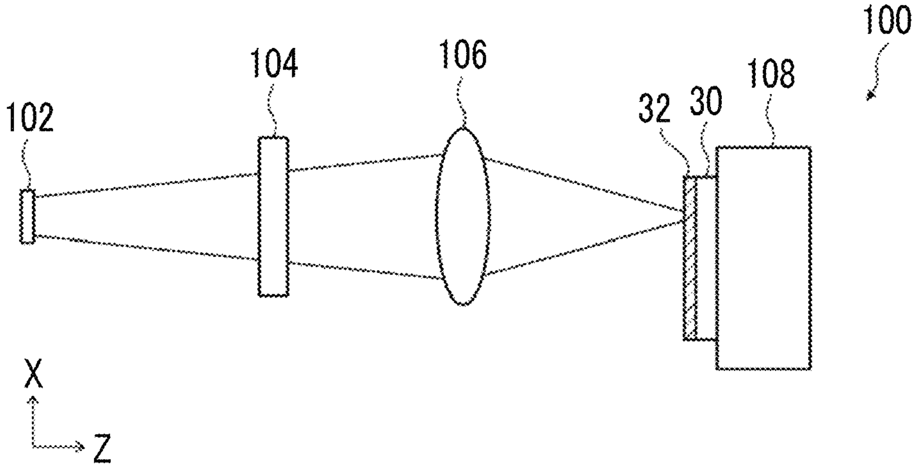
FIG. 6 is a conceptual diagram showing another example of the exposure device which exposes the alignment film to form an alignment pattern.

FIG. 6 conceptually shows another example of an exposure device which exposes the alignment film to form, in the liquid crystal layer, the concentric circular alignment pattern for forming the liquid crystal alignment pattern as shown in FIG. 1.

An exposure device 100 shown in FIG. 6 includes a light source 102, a λ/2 plate 104 which changes a polarization direction of light emitted from the light source 102, a lens 106 which is disposed on an optical path, and an XY stage 108. The exposure device 100 directly focuses a linearly polarized light beam onto the alignment film, and scans a focusing position to draw an alignment pattern on the alignment film.

The light source 102 includes a laser and a linearly polarizing plate, and emits linearly polarized light. The emitted linearly polarized light is incident into the λ/2 plate 104. The λ/2 plate 104 is rotatably attached, and is rotatable around an axis perpendicular to an XY plane of the XY stage 108.

The λ/2 plate 104 rotates around the axis perpendicular to the XY plane to convert the polarization direction of the incident linearly polarized light into any direction. The lens 106 focuses the linearly polarized light transmitted through the λ/2 plate 104 on the surface of the alignment film 32 disposed on the XY stage 108. The support 30 including the alignment film 32 is disposed on the XY stage 108, and the alignment film 32 (support 30) is moved in the X direction and/or the Y direction (direction perpendicular to the paper plane) to change the position on the surface of the alignment film 32 where the light is focused. That is, the XY stage 108 scans the surface of the alignment film 32 with the light.

The rotation of the λ/2 plate 104 and the movement of the XY stage 108 are controlled by, for example, a computer to associate the position on the surface of the alignment film 32 where the light is focused and the polarization direction of the light with each other, and as a result, a desired alignment pattern can be formed on the alignment film.

The irradiation of the light beam from the light source 102, the rotation of the λ/2 plate 104, and the movement of the XY stage 108 may be performed alternately or simultaneously. That is, for example, the XY stage 108 is driven such that the alignment film 32 is moved to a predetermined position and stopped, and is rotated such that the polarization direction of the linearly polarized light transmitted through the λ/2 plate 104 is a predetermined direction. Thereafter, the alignment film 32 is irradiated with the light beam from the light source 102 to expose a predetermined position on the surface of the alignment film 32, and the irradiation of the light is stopped. Thereafter, the XY stage 108 is driven such that the alignment film 32 is moved to a next predetermined position (exposure position) and stopped, and is rotated such that the polarization direction of the linearly polarized light transmitted through the λ/2 plate 104 is a predetermined direction. Thereafter, the alignment film 32 is irradiated with the light beam from the light source 102 to expose a predetermined position on the surface of the alignment film 32, and the irradiation of the light is stopped. In this way, by alternately repeating the movement of the XY stage 108 and the irradiation of the light beam from the light source 102, the exposure of the alignment film 32 may be performed intermittently.

Alternatively, while driving the XY stage 108 to move the alignment film 32 in a predetermined direction and rotating the λ/2 plate 104, the surface of the alignment film 32 may be irradiated with the light beam from the light source 102 to continuously expose the alignment film 32.

Alternatively, for example, in a case where an alignment pattern including regions where orientations of alignment axes are different in a stripe shape is exposed, while irradiating a region where the orientations of the alignment axes are the same with the light beam from the light source 102 in a state in which the λ/2 plate is fixed in a certain direction, the XY stage 108 is driven to move the alignment film 32 in a predetermined direction and to expose the region. Thereafter, in order to expose a region where the orientation of the alignment axis is different from that of the previous region, while rotating the λ/2 plate and irradiating the region with the light beam from the light source 102, the XY stage 108 is driven to move the alignment film 32 in a predetermined direction and to expose the region. By repeating the exposure, the alignment pattern including a region where the orientation of the alignment axes are different in a stripe shape may be exposed.

The intensity, exposure time, and the like of the light to be irradiated may be appropriately set depending on the material for forming the alignment film and the like.

The exposure amount per unit area can be adjusted by adjusting the intensity of the light to be irradiated and a scanning speed. From the viewpoint of performing the exposure sufficient to impart aligning properties to the alignment film 32, the exposure amount per unit area is preferably 100 $mJ/m^2$ or more, and more preferably 150 $mJ/m^2$. In addition, from the viewpoint of preventing the decrease in aligning properties due to excessive irradiation, the exposure amount is preferably 5 $J/m^2$ or less and more preferably 3 $J/m^2$ or less.

In addition, a spot diameter of the light beam to be focused in the alignment film may be any size as long as a desired alignment pattern can be imparted to the alignment film.

<Liquid Crystal Layer-Forming Step>

The liquid crystal layer-forming step is a step of forming a liquid crystal layer on the alignment film formed in the alignment film-forming step. The liquid crystal layer can be formed by fixing a liquid crystal phase in which the liquid crystal compound is aligned in a predetermined liquid crystal alignment state in a layer shape.

A structure in which the liquid crystal phase is fixed may be any structure as long as the alignment of the liquid crystal compound in the liquid crystal phase is maintained; and typically, the structure is preferably a structure in which a polymerizable liquid crystal compound is brought into a predetermined alignment state and is polymerized and cured by ultraviolet irradiation, heating, and the like to form a layer without fluidity, and simultaneously, the layer changes to a state in which an external field or an external force does not cause a change in alignment.

In the structure in which the liquid crystal phase is fixed, it is sufficient that optical properties of the liquid crystal phase are maintained, and it is not necessary that the liquid crystal compound exhibits liquid crystal property in the liquid crystal layer. For example, the polymerizable liquid crystal compound may lose its liquid crystal property by increasing its molecular weight by a curing reaction.

Examples of a material used for forming the liquid crystal layer obtained by fixing the liquid crystal phase include a liquid crystal composition containing a liquid crystal compound.

As the liquid crystal compound contained in the liquid crystal composition, a known liquid crystal compound can be used, and a polymerizable liquid crystal compound is preferable from the viewpoint of excellent heat resistance, durability, and handleability.

In addition, the liquid crystal composition used for forming the liquid crystal layer may further contain a surfactant, a polymerization initiator, a crosslinking agent, a solvent, and the like.

In a case where the liquid crystal layer is formed, it is preferable that the liquid crystal layer is formed by applying the liquid crystal composition onto the alignment film, aligning the liquid crystal compound to a liquid crystal phase state in a predetermined liquid crystal alignment state, and curing the liquid crystal compound. As a result, in the liquid crystal layer, the liquid crystal alignment pattern region, the outer peripheral region, and the non-aligned region are formed according to the alignment restriction force applied to the alignment film in the alignment film-forming step, and the sheet according to the embodiment of the present invention is manufactured.

For the application of the liquid crystal composition, any known method capable of uniformly applying a liquid onto the support, such as printing methods such as ink jet and scroll printing, spin coating, bar coating, and spray coating, can be used. By uniformly applying the liquid crystal composition in the liquid crystal layer-forming step, a liquid crystal layer having a plurality of specified regions serving as a precursor of a plurality of liquid crystal optical elements can be provided. Therefore, there are advantages in that the manufacturing efficiency and quality of the liquid crystal optical element are excellent, and the uniformity of quality and stability of the manufactured liquid crystal optical element are high.

The applied liquid crystal composition is dried and/or heated as necessary and then cured, and as a result, the liquid crystal layer is formed. In the drying and/or heating step, the liquid crystal compound in the liquid crystal composition may be aligned in a predetermined alignment state. In a case of heating, a heating temperature is preferably 200° C. or lower, and more preferably 130° C. or lower.

The aligned liquid crystal compound is further polymerized as necessary. The polymerization may be thermal polymerization or photopolymerization by light irradiation, but photopolymerization is preferable. It is preferable to use ultraviolet rays for the light irradiation. An irradiation energy is preferably 20 $mJ/cm^2$ to 50 $J/cm^2$ and more preferably 50 to 1,500 $mJ/cm^2$. In order to promote the photopolymerization reaction, the light irradiation may be performed under heating conditions or in a nitrogen atmosphere. A wavelength of the ultraviolet rays to be emitted is preferably 250 to 430 nm.

The support used in the alignment film-forming step may be peeled off and removed as necessary. In a case of peeling off the support, the support may be peeled off and removed together with the alignment film, or the support may be peeled off between the alignment film and the support, and only the support may be removed.

[Manufacturing Method of Liquid Crystal Optical Element]

The sheet according to the embodiment of the present invention is a multi-cutting sheet of liquid crystal optical elements, and a liquid crystal optical element having the liquid crystal alignment pattern can be manufactured by cutting the sheet according to the embodiment of the present invention into a predetermined shape.

The manufacturing method of a liquid crystal optical element preferably includes a step of cutting out the specified region including the liquid crystal alignment pattern from the sheet according to the embodiment of the present invention.

By manufacturing a liquid crystal optical element using the sheet according to the embodiment of the present invention, a liquid crystal optical element having excellent quality and high uniformity of quality and stability can be obtained.

The method of manufacturing the liquid crystal optical element from the sheet according to the embodiment of the present invention will be described in more detail using the sheet 1 shown in FIG. 1 as an example.

The outer periphery of the specified region 18 including the liquid crystal alignment pattern region 12 in the sheet 1 is composed of any of the cut lines X1 to X4 and Y1 to Y4. All of the cut lines X1 to X4 and Y1 to Y4 are included in any of the outer peripheral region 14 and the non-aligned region 16, and do not pass through the liquid crystal alignment pattern region 12. By cutting the sheet 1 along the cut lines X1 to X4 and Y1 to Y4, the specified region 18 is cut out, and a plurality of liquid crystal optical elements including the liquid crystal alignment pattern region are manufactured.

As a method of cutting the sheet, a known method can be used, and for example, a cutting method using a laser cut, a blade, a trimmer, or the like is adopted.

As described above, in the manufacturing method of a liquid crystal optical element according to the embodiment of the present invention, in which a plurality of liquid crystal optical elements are manufactured by cutting out the specified region from the sheet, a liquid crystal optical element having excellent quality and excellent uniformity of quality and stability can be more efficiently manufactured.

In the above-described manufacturing method, an example in which the specified region 18 consisting of the liquid crystal alignment pattern region 12 and the outer peripheral region 14 surrounding the outer periphery of the liquid crystal alignment pattern region 12 is cut out by cutting the sheet 1 along the cut lines X1 to X4 and Y1 to Y4 shown in FIG. 1 has been described; but the cut line for cutting out the specified region from the sheet according to the embodiment of the present invention is not limited to the cut lines shown in FIG. 1.

For example, as shown in FIG. 4, the liquid crystal optical element can be manufactured by cutting the sheet 110 along the cut lines X1 to Xn and Y1 to Y3 and cutting out the specified region 400 consisting of the liquid crystal alignment pattern region 200, the outer peripheral region 201, and a part of the non-aligned region 300 surrounding the outer peripheral region 201.

In addition, the cut line for cutting out the specified region may include a linear portion and a curved portion. In a case where the cut line consists of only a linear portion, breakage such as cracks may occur at corners where a plurality of cut lines intersect due to the cutting of the sheet. On the other hand, in a case where the cut line includes a linear portion and a curved portion, the occurrence of the breakage such as cracks can be suppressed.

In a case where the cut line includes a linear portion and a curved portion, the minimum curvature radius of the curved portion is preferably 0.2 mm or more, and more preferably 0.4 mm or more. The upper limit value thereof is not particularly limited, but is, for example, 20 mm or less, preferably 10 mm or less.

Furthermore, the cut line for cutting out the specified region may be included in any one of the outer peripheral region or the non-aligned region. By including the cut line in any of the outer peripheral region or the non-aligned region, as described above, the occurrence of the breakage in an unintended direction at the end part of the liquid crystal optical element cut along the outer periphery of the outer peripheral region is suppressed, and as a result, a plurality of liquid crystal optical elements having improved quality and uniformity of quality can be manufactured from the same sheet.

The cut line for cutting out the specified region may be included only in the outer peripheral region. That is, the cut line may be an annular line which is included only in the outer peripheral region and surrounds the liquid crystal pattern region. The liquid crystal optical element can also be manufactured by cutting along such a circular cut line and extracting the specified region consisting of the liquid crystal alignment pattern region and a part of the outer peripheral region surrounding the liquid crystal alignment pattern region.

The liquid crystal optical element manufactured from the sheet according to the embodiment of the present invention can be suitably used, for example, as an optical member such as an optical path changing member, a light collecting element, a diffraction element, and a light diffusing element in an optical device.

In particular, the liquid crystal optical element manufactured from the sheet according to the embodiment of the present invention can be suitably used as an optical member constituting an image display apparatus of a head mounted display such as augmented reality (AR) glasses, VR glasses, and mixed reality (MR) glasses. By using the sheet according to the embodiment of the present invention, it is possible to manufacture a head mounted display having small individual differences in liquid crystal optical elements and exhibiting expected optical functions.

EXPLANATION OF REFERENCES

1, 110: sheet
10: liquid crystal layer
12, 200: liquid crystal alignment pattern region
14, 201: outer peripheral region
16, 300: non-aligned region
18, 400: specified region
30: support
32: alignment film
40: liquid crystal compound
42: bright line
44: dark line
80, 100: exposure device
82: laser
84, 102: light source
86, 94: polarization beam splitter
90A, 90B: mirror
92, 106: lens
96: λ/4 plate
98: mask
104: λ/2 plate
108: XY stage
500: outer peripheral edge
X1, X2, X3, X4, Xn, Y1, Y2, Y3, Y4: cut line

What is claimed is:

1. A sheet comprising:
a liquid crystal layer containing a liquid crystal compound,
wherein the liquid crystal layer has a plurality of liquid crystal alignment pattern regions having a liquid crystal alignment pattern in which an orientation of optical axes derived from the liquid crystal compound changes while continuously rotating in at least one in-plane direction,
the plurality of liquid crystal alignment pattern regions are arranged to be spaced apart from each other in two directions orthogonal to each other in a plane of the liquid crystal layer, with a non-aligned region interposed between liquid crystal alignment pattern regions,
two or more of the liquid crystal alignment pattern regions are arranged in each of the two directions in the liquid crystal layer,
the non-aligned region is a region having no liquid crystal alignment pattern and no slow axis,
an outer periphery of the liquid crystal alignment pattern region is surrounded by an outer peripheral region,
the outer peripheral region is a region having no liquid crystal alignment pattern and having a slow axis, and
a specified region including the liquid crystal alignment pattern region is capable of being cut out as a liquid crystal optical element.

2. The sheet according to claim 1,
wherein the outer periphery of the liquid crystal alignment pattern region includes a linear portion and a curved portion, and
a minimum curvature radius of the curved portion is 0.2 mm or more.

3. The sheet according to claim 2,
wherein at least one alignment mark indicating an outer periphery of the specified region or an optical center of the liquid crystal alignment pattern region is provided in the non-aligned region.

4. The sheet according to claim 1,
wherein the specified region is composed of the liquid crystal alignment pattern region and a part of the outer peripheral region.

5. The sheet according to claim 1, further comprising:
a support supporting the liquid crystal layer.

6. A manufacturing method of a liquid crystal optical element, comprising:
a step of cutting out the specified region including the liquid crystal alignment pattern region from the sheet according to claim 1.

7. The manufacturing method of a liquid crystal optical element according to claim 6,
wherein, in the step, the specified region is cut out by cutting the sheet along a cut line including a linear portion and a curved portion, and
a minimum curvature radius of the curved portion is 0.2 mm or more.

8. The manufacturing method of a liquid crystal optical element according to claim 7,
wherein the cut line is included in any one of the outer peripheral region or the non-aligned region.

9. The manufacturing method of a liquid crystal optical element according to claim 8,
wherein the cut line is included only in the outer peripheral region.

10. The sheet according to claim 2,
wherein the specified region is composed of the liquid crystal alignment pattern region and a part of the outer peripheral region.

11. The sheet according to claim 2, further comprising:
a support supporting the liquid crystal layer.

12. A manufacturing method of a liquid crystal optical element, comprising:
a step of cutting out the specified region including the liquid crystal alignment pattern region from the sheet according to claim 2.

13. The manufacturing method of a liquid crystal optical element according to claim 12,
wherein, in the step, the specified region is cut out by cutting the sheet along a cut line including a linear portion and a curved portion, and
a minimum curvature radius of the curved portion is 0.2 mm or more.

14. The manufacturing method of a liquid crystal optical element according to claim 13,
wherein the cut line is included in any one of the outer peripheral region or the non-aligned region.

15. The manufacturing method of a liquid crystal optical element according to claim 13,
wherein the cut line is included only in the outer peripheral region.

16. The sheet according to claim 3,
wherein the specified region is composed of the liquid crystal alignment pattern region and a part of the outer peripheral region.

17. The sheet according to claim 3, further comprising:
a support supporting the liquid crystal layer.

18. A manufacturing method of a liquid crystal optical element, comprising:
a step of cutting out the specified region including the liquid crystal alignment pattern region from the sheet according to claim 3.

19. The manufacturing method of a liquid crystal optical element according to claim 18,
wherein, in the step, the specified region is cut out by cutting the sheet along a cut line including a linear portion and a curved portion, and
a minimum curvature radius of the curved portion is 0.2 mm or more.

20. The manufacturing method of a liquid crystal optical element according to claim 19,
wherein the cut line is included in any one of the outer peripheral region or the non-aligned region.

* * * * *